Sept. 11, 1962   R. E. SELF ETAL   3,053,236
OSCILLATORY ACTUATOR SEAL SYSTEM
Filed Sept. 8, 1960   2 Sheets-Sheet 1
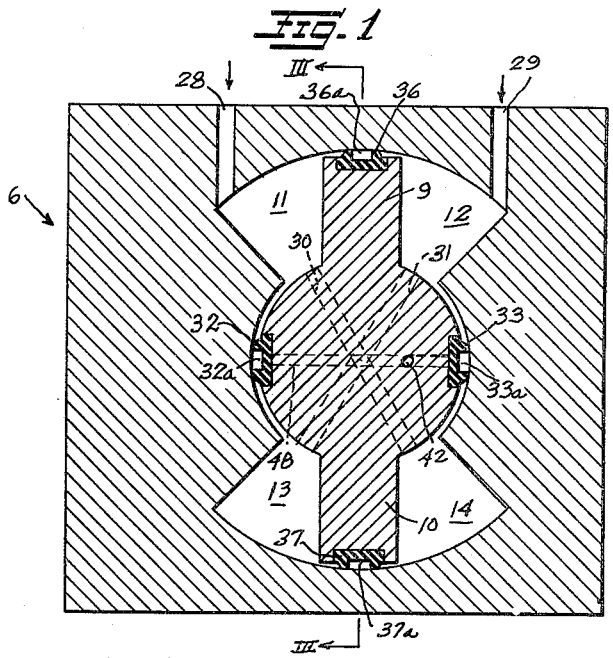
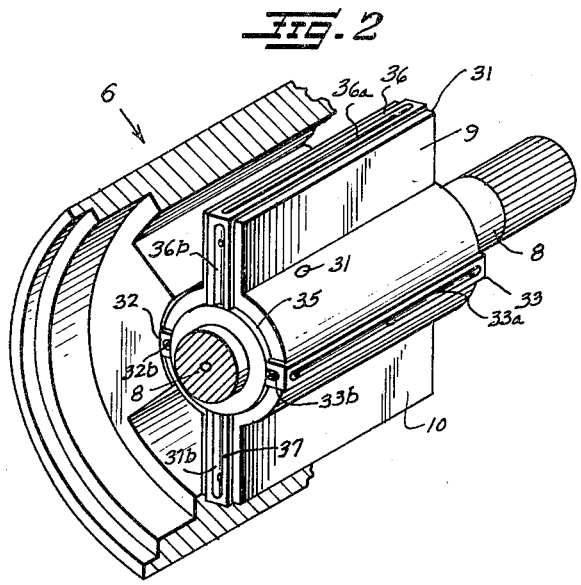
Inventors
Richard E. Self
Arthur R. Allan

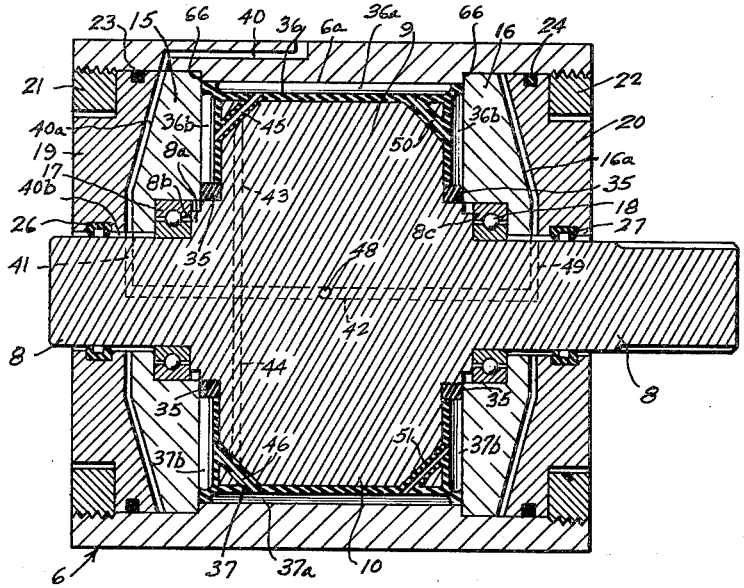
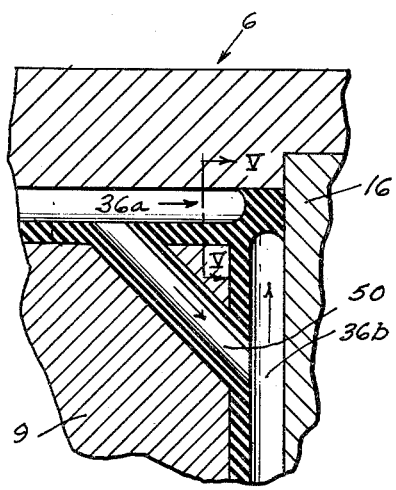
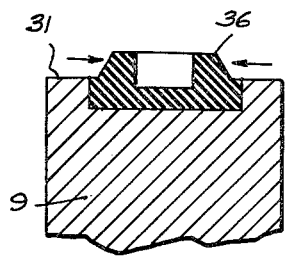

United States Patent Office 3,053,236
Patented Sept. 11, 1962

---

3,053,236
OSCILLATORY ACTUATOR SEAL SYSTEM
Richard E. Self, Los Alamitos, and Arthur R. Allan, Glendora, Calif., assignors to Thompson Ramo Wooldridge Inc., Cleveland, Ohio, a corporation of Ohio
Filed Sept. 8, 1960, Ser. No. 54,755
7 Claims. (Cl. 121—99)

The present invention relates to seal means and is more particularly directed to improved methods and means for sealing oscillatory actuators and the like.

Heretofore, pneumatically and hydraulically operated servomechanisms have been employed for actuation of flight stabilization and control components, such as flight control surfaces of rockets, missiles and related air and space-borne vehicles.

It has been customary in the art to employ oscillatory servomechanism rather than linear servomechanisms. Since almost all servomechanism applications require an oscillatory motion, therefore, the simplest way of providing such motion is by use of an oscillatory actuator. Moreover, since most applications require an oscillating motion through small angles, several sets of vanes may be mounted on the actuator shaft providing thereby the maximum torque output for any given actuator configuration. Still another factor contributing to the preference of oscillatory actuators is that the mass of the actuator rotor is balanced about the center of rotation, and thus, actuator performance is substantially unaffected by linear vibrations induced during actual flight conditions.

However, along with the above advantages of oscillatory actuators, the one common disadvantage thereof must be accepted—that of sealing. Briefly stated, it is more difficult to seal a square vane than a round piston.

Since oscillatory motion is imparted to the actuator rotor by pneumatic or hydraulic differential pressures exerted against the vanes of the actuator rotor shaft, seal means are required for the periphery of each actuator vane and the rotor body to provide leakproof pressure compartments on opposed sides of each vane. Prior attempts to provide reliable sealing means included employment of spring-loaded seals in grooves formed in the actuator housing, the rotor and in the vanes.

However, in addition to being ineffective seals, wiper type seals depend upon a flat metal-to-metal surface between the actuator housing and the wiper seal surface, thus requiring extensive machining and finishing, and thereby increasing the costs of manufacturing the actuator assemblies.

Another problem associated with use of wiper type seals was that breakaway friction between seal and housing was quite high, and the attendant wear between the seal and housing tended to permit leakage across the seals from one chamber to another, thereby affecting optimum performance of not only the actuator and control surface operatively connected thereto, but also the performance of the air or space-borne vehicle in which the actuator is employed. The effects of vehicle vibrations on springback seals are self-evident.

In addition, a particularly difficult area to seal is the square or flat corners between the actuator housing and seal as is more fully hereinafter described.

By our invention, we substantially overcome the problems and difficulties of the prior art and provide means for sealing the pressurizing medium compartments of oscillatory actuators having as a major feature thereof sealing of the square corners of the oscillating rotor vanes.

It is therefore an object of the present invention to provide improved sealing means for oscillating servo-mechanism assemblies.

It is another object of the present invention to provide improved sealing means having special applicability to oscillatory rotors of servomechanism actuators.

It is still another object of the present invention to provide improved means for sealing the surfaces of oscillatory rotor vanes to provide leakproof compartments on opposed sides of said vanes.

It is a further object of the present invention to provide improved means for sealing pressurizing medium compartments of oscillatory actuators requiring a minimum of finishing and machining of the actuator assembly components.

It is a still further object of the present invention to provide improved means for sealing oscillatory actuator assembly vane compartments by providing seal means only on the rotor and components carried thereby.

It is yet another object of the present invention to provide a method for sealing pressurizing medium compartments of oscillatory actuator assemblies.

Another object of the present invention is to provide seal means for oscillatory actuator assemblies which are simple and compact in construction, and efficient in operation.

These and other objects, features and advantages of the present invention will become more apparent upon a careful consideration of the following detailed description, when considered in conjunction with the accompanying drawing illustrating a preferred embodiment of the concepts of our invention, wherein like reference characters and numerals refer to like and corresponding parts throughout the several views.

On the drawings:

FIGURE 1 is a view in cross section of apparatus embodying the novel seal means of the present invention;

FIGURE 2 is a perspective view in partial section of the actuator of FIGURE 1;

FIGURE 3 is a view taken along line III—III of FIGURE 1;

FIGURE 4 is an enlarged fragmentary view illustrating the corner sealing feature of the present invention; and FIGURE 5 is a view taken along lines V—V of FIGURE 4.

As shown on the drawings:

Referring particularly to FIGURES 1 and 3, the actuator assembly of the present invention includes a housing, generally indicated by the numeral 6, defining a pair of branch rotor shaft vane chambers radiating from a centrally located chamber adapted to receive the shafted rotor 7, the shaft 8 of which carries a pair of diametrically opposed vanes 9 and 10. Vane 9 separates one of the branch chambers into a pair of opposed pressurizing medium compartments 11 and 12, whereas vane 10 separates the other branch chamber into a pair of similar compartments 13 and 14 (FIG. 3).

As appears in FIGURE 3, the generally rectangularly shaped actuator housing 6 is longitudinally bored, and the housing 6 includes an inner stepped portion 6a which cooperates with the vaned rotor 7 and a pair of platens 15 and 16 positioned at each end of the housing to define the vane compartments 11 through 14.

Each of the platens 15 and 16 is bored to receive the rotor shaft 8 to thereby permit oscillation of the shaft, and each is counterbored to receive a conventional shaft bearing 17 and 18 respectively. The shaft may be provided with a stepped portion 8a and the shoulders 8b and 8c at each end thereof cooperate with the shoulders provided by the platen counterbores to secure the shaft bearings 17 and 18. The platens 15 and 16 engage the shoulders 6b and 6c respectively of the stepped portion 6a of the housing thereby cooperating with the rotor, vanes and housing to define the respective vane compartments.

Each platen is also grooved to communicate the tolerance space between the shaft and bore of the platens for purposes hereinafter described.

The platens may be held in place securely by a pair of cover plates 19 and 20, each of which is provided with an annular recess to receive a retaining ring 21 and 22 respectively in threaded engagement with the housing 6. A pair of conventional seal means 23 and 24 are seated in grooves formed in the end plates to prevent leakage from the housing and a pair of shaft seals 26 and 27 are seated in the end plates. As appears in FIGURE 1, a passage 28 is formed in the housing for communicating the compartment 11 with a source of pressurizing medium, such as gas, and, similarly, compartment 12 may communicate with a source of pressurizing medium through a housing formed passage 29. Compartment 11 communicates with compartment 14 through a rotor formed passage 30, whereas compartment 12 communicates with compartment 13 through a rotor formed passage 31.

Thus, in operation the actuator unit is appropriately mounted in or on an air or space-borne vehicle with which it is employed. The actuator shaft 8 is coupled to the flight control surface or other desired attitude control means or may be employed as an auxiliary power unit for driving turbo pumps and related components of the vehicle.

The discussion now to follow will describe, in general, the operating principles of the preferred embodiment of the oscillating actuator assembly illustrated in the drawing.

A pressurizing medium, hydraulic or pneumatic, may be introduced from a pressure source (not shown) through the pair of actuator housing formed passages 28 and 29 into the pressurizable compartments 11 and 12 defined by the rotor vane 9. The pressurizing medium is also introduced through the pair of actuator shaft formed passages 30 and 31 into the pressurizable vane compartments 13 and 14 on opposed sides of the rotor vane 10.

Pressure conditions, and thus oscillatory movement of the vanes and rotor shaft, may be controlled by varying the pressure conditions in passages 28 and 29 respectively to create differential pressure conditions in vane compartments 11 and 12 respectively. By causing a differential pressure condition to exist on opposed sides of the vane 9, the vane will be moved in the direction of low pressure, thus moving the actuator rotor and shaft in the direction of low pressure. Thus, by regulating the pressures in the conduits 28 and 29 to vary the respective pressure conditions in the opposed vane compartments, the actuator shaft, and thus the flight control surface to which it is coupled, may be moved angularly in either direction within the effective operating limits of the vane compartments.

It will be understood that any suitable means may be employed to vary the pressure conditions in the vane compartments contemplated within the concepts of the present invention. Additionally, it will be understood that the present invention has applicability to servomechanism actuator assemblies having multiple vanes and vane compartments operating on similar principles as well as the specific apparatus shown in the drawing hereof.

For the purpose of preventing leakage from the vane compartments and across the leading edges of the vanes a sealing system is provided which includes, as appears in FIGURE 2 and in FIGURE 1, a pair of seal members 32 and 33 which are seated in grooves on opposed sides of the rotor in wiping contact with the web arcuate surfaces of the housing which define the central rotor chamber. Each of the seals 32 and 33 extends axially with the rotor and then abruptly radiates inwardly from the periphery of the rotor along the rotor end surfaces and terminates in contact with annular seals 35 of elastomeric material which circumscribe the rotor shaft stepped portion at both ends thereof.

Similarly the leading edge of each vane is grooved to receive a seal of elastomeric material extending axially with the rotor and radially along the minor surfaces of each vane terminating in contact with the seals 35. Thus, vane 9 is provided with a seal 36 and vane 10, with a seal 37.

Vane seals 36 and 37, therefore, prevent leakage across the leading edge of each vane from the vane compartments on opposed sides of each vane, annular seals 35 on the opposed sides of the stepped portion of the rotor cooperate to prevent leakage from the vane compartments along the actuator shaft, whereas rotor seals 32 and 33 prevent leakage from one vane compartment to another vane compartment across the rotor.

As appears in FIGURES 2 and 3 each of the vane seals 36 and 37 has a groove 36a and 37a in the portion thereof which is axially aligned with the vane. Each groove terminates inwardly of each end of the seal adjacent the right angle corners. Similarly the radial portions of the seals 36 and 37 are provided with grooves 36b and 37b, each of which terminate inwardly of the seal adjacent the merging end thereof and is open at the other end adjacent the annular rotor seals 35.

Rotor seals 32 and 33 are provided with similar grooves 32a and 33a and each of the radial portions thereof are provided with grooves 32b and 33b similar to grooves 36b and 37b.

As exemplified in FIGURE 5, the outer surfaces of each rotor seal 32 and 33 and each vane seal 36 and 37 are convergingly tapered whereby pressure forces acting in the vane compartments will tend to force the opposed surfaces of the seal together thereby effecting greater sealing as shown by the arrows. The seal grooves, however, are provided in order that a pressurized medium may be introduced therein to obtain still greater sealing between the vane compartments.

For introducing a pressurizing medium into the seal grooves, a housing formed passage 40 communicating with the platen groove 40a and the tolerance space 40b between the shaft and the platen 15 is provided. A transverse passage 41 formed in the rotor shaft communicates an axially aligned rotor passage 42 with a branch passage 43 which supplies the pressurizing medium to a passage 45 formed in the vane 9 which communicates the seal groove 36a with the seal groove 36b. If desired passage 45 may be provided with an elastomeric seal to prevent corrosion of the vane. Similarly the axially aligned passage 42 communicates through a branch passage 44 a passage 46 formed in the vane 10 with a pressurizing medium source for supplying the pressurizing medium to both vane grooves 37a and radial grooves 37b.

Passage 42 communicates also with a transverse passage 48 formed in the rotor for introducing the pressurizing medium into the rotor grooves 32a and 33a which communicate with the radial grooves 32b and 33b through passages (not shown) comparable to passages 45 and 46 respectively. Passage 42 also communicates through a transverse passage 49 with the groove 16a formed in the platen 16 to thereby permit equal balancing of the rotor by the platens 15 and 16.

Referring to FIGURE 3, the grooves 36a and 37a communicate with the grooves 36b and 37b respectively through a pair of passages 50 and 51 formed in vanes 9 and 10 respectively, for introducing the pressurizing medium therein whereby pressure is applied against both sides of the corner portion of the seals thereby ensuring a leakproof seal.

Thus, in operation, a pressurizing medium may be introduced into the passages 45 and 46 through the axially aligned passage 42 and the pressure developed in the seal grooves, as shown in FIGURE 4 effectively seals the right angle corners of the vane seals. Preferably the pressure level in the grooves is above that in the vane compartment to ensure effective sealing across the compartments. Similarly the pressure applied through the transverse passage 48 effectively seals the right angle boundaries of the rotor seals.

It will be appreciated of course that for particular applications the leading edge vane sealing system may be employed independently of the rotor sealing system and vice versa. Similarly the vane sealing means, rotor sealing means and rotor end portion sealing means may be integrally formed to provide a continuous sealing element for the actuator unit.

Thus it will be appreciated by our invention we provide effective means and methods for sealing the right angle corners of oscillatory actuator units and the like and provide a zero leakage system.

Although various minor modifications might be suggested by those versed in the art, it should be understood that we wish to embody within the scope of the patent arranged hereon all such embodiments as reasonably and properly come within the scope of our contribution to the art.

We claim as our invention:

1. Apparatus for sealing corners formed by a housing and the housing having a movable member therein comprising: sealing means carried by said movable member, said sealing means being in sealing contact with said housing and having a sealing corner end coextensive with said housing formed corner, a groove defined by said sealing means terminating inwardly of the sealing corner end, said housing and said groove defining therebetween a pressuridable channel, and means for pressuriding said channel whereby pressure forces in said channel urge the sealing corner end of said sealing means against said housing to thereby seal said housing formed corner.

2. Apparatus for sealing substantially right angle corners formed by a housing and said housing having a movable member therein comprising: resilient material carried by said movable member between said movable member and said housing being in sealing contact with said housing and having a sealing corner end coextensive with the right angle housing formed corner, a groove defined by said resilient material terminating inwardly of the sealing corner end and cooperating with said housing to define therebetween a pressurizable channel, and means for pressurizing said channel whereby pressure forces acting in said channel urge the sealing corner end portion of said resilient material against said housing to seal said right angle housing formed corner.

3. Apparatus for sealing corners formed by a housing and said housing having therein a movable member with a longitudinal leg and a radial leg, comprising: a strip of resilient material carried by said movable member between said movable member and said housing being in sealing contact with said housing and coextensive with the longitudinal and radial legs of said movable member, said resilient strip on the longitudinal leg and radial leg forming a sealing strip corner end coextensive with said housing formed corner, a groove defined by said strip in each of said legs, each of said grooves terminating inwardly of the strip corner end adjacent said housing formed corner, said housing and said grooves cooperating to define therebetween pressurizable channels, and means for pressurizing said channels whereby pressure forces acting in said channels urge the corner end portion of said resilient material against said housing to seal said housing formed corner.

4. Apparatus for sealing corners formed by a housing and said housing having therein a rotary member with an axially extending surface and a radially extending surface comprising: a strip of resilient material carried by said rotary member between said rotary member and said housing being in sealing contact with said housing and coextensive with the axial and radial surfaces of said rotary member, said strip and resilient material on the axial surface and radial surface forming a sealing strip corner end coextensive with said housing formed corner, a groove defined by said resilient material in each surface of said strip, each of said grooves terminating inwardly of the strip corner end adjacent said housing formed corner, said housing and said grooves defining therebetween a pair of pressurizable channels, and means for pressurizing said channels whereby pressure forces acting in said channels urge the corner end portions of said resilient material against said housing to seal said housing formed corners.

5. Apparatus for sealing corners formed by a housing and said housing having a movable member therein with a longitudinal leg and a radial leg, comprising: a strip of resilient material carried by said movable member between said movable member and said housing being in sealing contact with said housing end coextensive with the longitudinal and radial legs of said movable member, said strip of resilient material on the longitudinal leg and the radial leg forming a sealing strip corner end coextensive with said housing formed corner, a groove defined by said strip in each of said legs, each of said grooves terminating inwardly of the strip corner end adjacent to said housing formed corner, said housing and said grooves cooperating to define therebetween pressurizable channels, and a passage in said member communicating said grooves for introducing a pressurizing medium into said pressurizable channels from a common source whereby pressure forces acting in said channels urge the corner end portion of said strip against said housing to seal said housing formed corner.

6. In a device having a housing defining a chamber and a movable separator in the housing dividing the chamber into opposed compartments, the housing defining at least one corner, resilient material carried by said movable separator between said separator and said housing and in sealing contact with said housing, said resilient material forming a sealing material corner end coextensive with said housing formed corner, a groove defined by said resilient material terminating inwardly of the corner end of said resilient material adjacent said housing formed corner, said housing and said groove defining therebetween a pressurizable channel, and means for pressurizing said channel whereby pressure forces in said channel urge the corner portion of said resilient material against said housing to seal said housing formed corner.

7. In a device having a housing defining a chamber and a movable separator in the housing dividing the chamber into opposed compartments, the housing defining at least one corner, resilient material carried by said movable separator between said separator and said housing and in sealing contact with said housing, said resilient material forming a sealing material corner end coextensive with said housing formed corner, said resilient sealing material having an outer surface which convergingly tapers towards said housing, a groove defined by said resilient material terminating inwardly of the corner end of said resilient material adjacent said housing formed corner, said housing and said groove defining therebetween a pressurizable channel, and means for pressurizing said channel whereby pressure forces in said channel urge the corner portion of said resilient material against said housing to seal said housing formed corner.

References Cited in the file of this patent
UNITED STATES PATENTS

| | | |
|---|---|---|
| 1,799,294 | Gough | Apr. 7, 1931 |
| 2,798,462 | Ludwig | July 9, 1957 |
| 2,806,451 | Vinkler | Sept. 17, 1957 |